July 1, 1958
C. H. KLEIN ET AL
2,841,403
DETENT
Filed July 10, 1957
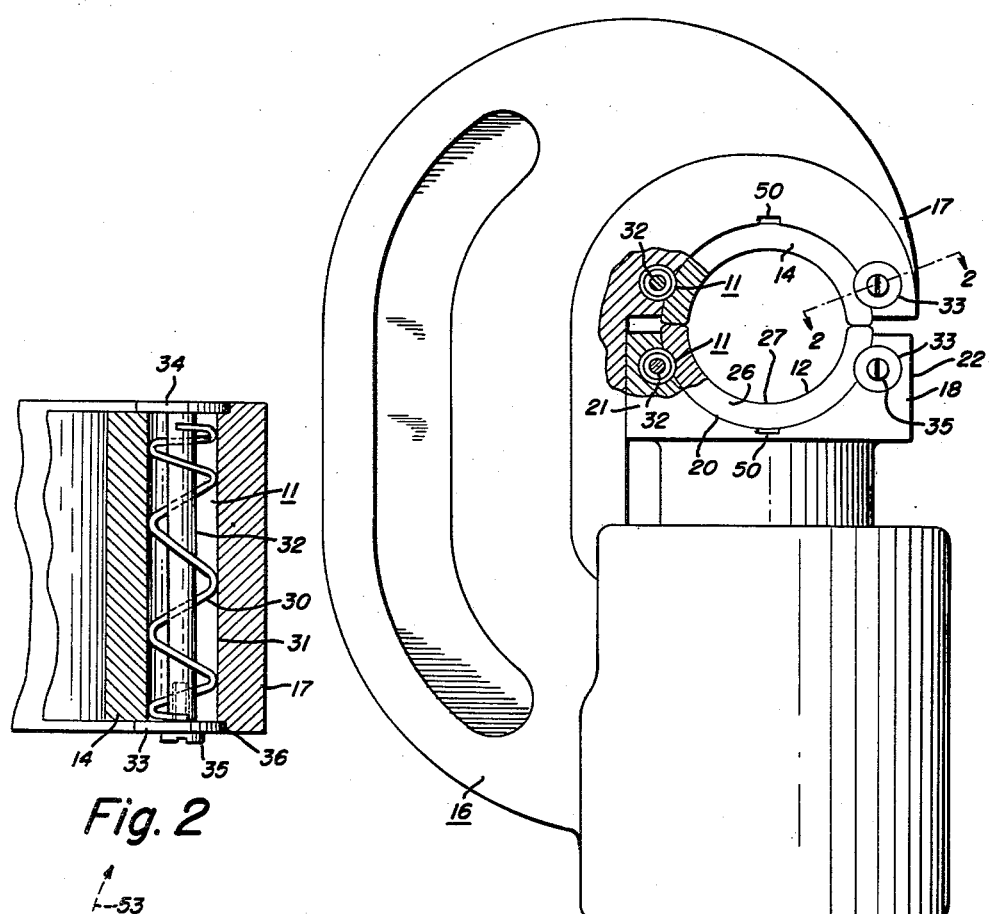
Fig. 1
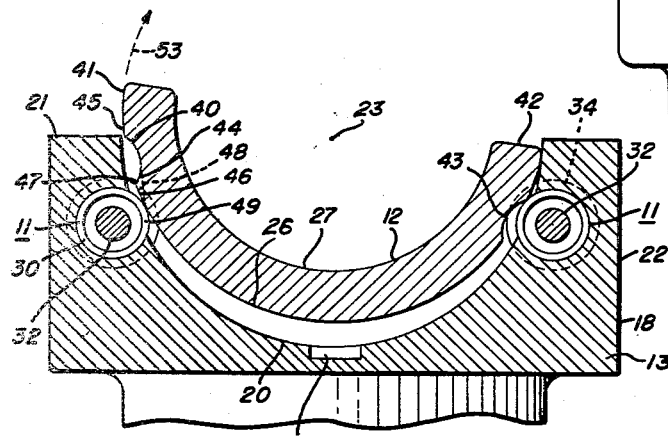
Fig. 2
Fig. 3
INVENTOR.
CHARLES H. KLEIN
WALTER E. NORTHCUTT
BY
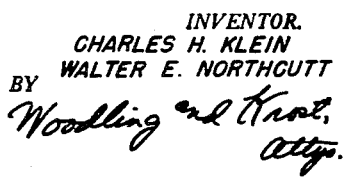

United States Patent Office 2,841,403
Patented July 1, 1958

2,841,403

DETENT

Charles H. Klein, Cleveland, Ohio, and Walter E. Northcutt, Melrose, Mass., assignors to The National Telephone Supply Company, a corporation of Ohio Application July 10, 1957, Serial No. 670,926

16 Claims. (Cl. 279—76)

The invention relates in general to detents to releasably hold together first and second members and more particularly to detents which may hold an insert in a tool. The prior art has known many detents and also detents for use in holding inserts in tools such as die inserts in a hydraulic pressing tool; however, these detents have often been unsatisfactory in that they were either too difficult to operate or else, if loosened, then became impositive in their action so as to not securely hold the two members together. Also, many detents easily became contaminated with foreign matter when used with tools which were subjected to rough handling and usage under dirty conditions. Further, many of the prior art detents had only a point contact or small area contact which placed a high unit stress on the members being held together which quickly wore out the material of the members so as to make the detent unsatisfactory after much use. Accordingly, an object of the invention is to provide a detent which overcomes the foregoing objections.

Another object of the invention is to provide a detent to releasably hold together two members which has a large area of contact for low per unit area stress of the material of which the members are made.

Another object of the invention is to provide a detent having a spring which is stressed lightly and well within the elastic limit of the spring material yet which detent is positive in action and one which does not change in action with long continued use.

Another object of the invention is to provide a detent which is well protected by an enveloping structure to prevent entrance of foreign matter.

Another object of the invention is to provide a detent which has a movable spring of wide spaced turns or pitch which pitch changes as the detent is used to loosen any foreign matter to cause it to fall out before the spring is packed full of foreign matter.

Other objects and a fuller understanding of this invention may be had by referring to the following description and claims, taken in conjunction with the accompanying drawing, in which:

Figure 1 is a side elevational view of a tool with which the detent may be used;

Figure 2 is an enlarged cross sectional view on the line 2—2 of Figure 1; and

Figure 3 is an enlarged cross sectional view through one pair of members with the detent of the invention acting therebetween.

The detent 11 of the invention releasably holds together first and second members 12 and 13. In the drawing, and merely for purposes of illustration but not limitation, the first member 12 has been shown as a die insert and the second member 13 has been shown as a die plunger 18. Additionally, another die insert 14 and die anvil 17 have been shown with these pairs of members being usable in any press where force is applied, and this has been shown in Figure 1 as a hydraulic pressing tool 16. In Figure 1, the die anvil 17 carries the die inserts 12 and 14 and are actuated by the plunger 18 through means of a hydraulic pump or other pressure source supplying fluid through a fitting nipple 19 to squeeze together the die inserts 12 and 14. These die inserts may be used to compress a wire or cable connecting sleeve upon ends of wires or cables to join them together.

Each of the die inserts 12 and 14 are essentially the same as far as the detent 11 is concerned and therefore only die insert 12 and its cooperation with die plunger 18 will be described.

The die plunger 18 has a cavity 20 with first and second sides 21 and 22 and an axis 23. The cavity 20 is shown as being semi-cylindrical to receive the semi-cylindrical outer surface or periphery 26 of the die insert 12. The die insert 12 also has an inner die surface 27 which engages the compression sleeves to be compressed.

The detent 11 comprises generally a cylindrical coil spring 30 of relatively widely spaced turns. The spring 30 is received within a slot or recess 31 formed in the second member 13 near each side thereof. Each of these slots receives the spring therein by enveloping more than one hundred eighty degrees of the cylindrical periphery of the spring, and in this case is shown as enveloping about two hundred forty degrees. A central shaft 32 is coaxial with the spring 30 and spaced from the turns thereof and held coaxial by spool ends 33 and 34. The spool end 34 may be riveted onto the shaft 32 and the spool end 33 may be fastened with a screw 35 for assembly and disassembly. The spool ends are contained within a counterbore 36 which counterbore is to a depth approximating the axial dimension of the die insert 12. Thus, the spool ends serve to align and center the die inserts in the anvil and plunger and to prevent relative axial shifting thereof.

A relatively shallow groove 40 is provided in the die insert 12 near a first side 41 thereof, and near the opposite second side 42 a second groove 43 is provided. The groove 40 forms first and second detent surfaces 44 and 45 with this groove being parallel to the axis 23 and of about one hundred twenty degrees arcuate extent. A shoulder 46 is inboard of and adjacent to the first detent surface 44 with this shoulder 46 being a part of the periphery or outer surface of the die insert 12. The first detent surface 44 and the shoulder 46 together comprise abutment means 47, to provide abutment to and interengagement with the spring 30. The shoulder 46 may be that part of the periphery 26 which lies outboard of a line 48 drawn on a radius from the center of the other groove 43. The Figure 1 shows the die insert 12 in detent engagement with the die plunger 18 with the coil spring 30 having a partially cylindrical portion 49 of its periphery in detent engagement with the groove 43. In such detent engaged position the outer periphery 26 of the die insert 12 engages the cavity 20 to provide a stop means between the first and second members 12 and 13. In such position the outer surface 26 of die insert 12, which is the stop means thereof, has a surface opposing the first detent surface 44 and therefore, when the coil spring 30 is in engagement with this detent surface 44, the die insert 12 is held in detent engagement with the die block 13. A screw driver slot 50 may be provided in the die block 13 for easy removal of the die insert 12.

Operation

The detent 11 operates to releasably hold together first and second members 12 and 13 by having the coil spring 30 engage the groove 43. The die insert 12 may be snapped into detent engaged position by first placing it in the position shown in Figure 3 wherein the groove 43 is in engagement with the respective coil spring and wherein the shoulder 46 engages the partially cylindrical portion 49 of spring 30. The two members 12 and 13 then have a path of relative movement therebetween which is an arcuate path 53 having the center of groove 43 as the pivot axis. When the die insert 12 is moved toward the member 13, the shoulder 46 engages the partially cylindrical portion 49 at the widely spaced turns to radially or transversely compress the spring 30. This causes longitudinal or axial expansion of the spring 30 to permit the shoulder 46 to pass the spring 30 and slot 31 so that the partially cylindrical portion 49 may come into detent engagement with the groove 40. It has been found that the die insert readily snaps into place and is securely and positively held in position until it is desired to be removed. The die insert 12 may be removed by grasping either side, such as the first side 41, and pulling it away from the member 13. Alternatively, a screw driver may be inserted in the screw driver slot 50 and used as a lever to remove the die insert 12. Upon such removal the first detent surface 44 will act as an abutment means to engage and transversely compress the spring 30 which again causes longitudinal expansion thereof to permit this first detent surface to pass the spring to a position such as that shown in Figure 3.

The longitudinal expansion of the spring is materially aided by the fact that the turns are relatively widely spaced and, in fact, the turns are at an appreciable acute angle relative to a plane normal to the axis of the spring 30; namely, the plane of the paper of Figure 3. Because of this longitudinal expansion of the spring 30, it is preferred that the length of this spring be less than that of the enveloping structure; namely, the slot 31 and the spool ends 33 and 34. This longitudinal movement of the spring also loosens any foreign matter which may be contained therein and, in fact, since the spring lengthens rather than shortens during the detent action, this aids in preventing packing of any foreign matter between the turns and, in fact, it loosens the foreign matter so that it falls out before it becomes packed between the turns of the coil spring. Also, it has been found that the transverse or radial compression of the spring with consequent axial expansion keeps the deformation of the spring well within the elastic limit for long life and constant operating characteristics.

The several turns of the coil spring and the long length thereof provide several bearing points on the first member or die insert 12 so that low per unit area stress on the first member 12 results, thus again assuring long life with constant operating characteristics as well as ready alignment into parallelism of the first and second members 12 and 13 without any twisting or binding. When the die insert 12 is in place, the entire detent mechanism 11 is enclosed by the two members 12 and 13 and the two spool ends to successfully prevent easy entrance of foreign matter. Thus the tool, such as the tool 16 with which the detent may be used, may be subjected to rough handling under adverse conditions without fouling the detent 11 and rendering it unsuitable for use.

The fact that the recess 31 is about two hundred forty degrees in arcuate extent provides the dual function of retaining the spring transversely within the slot without further aid and also presents the partially cylindrical portion 49 inboard of the cavity 20 so that less than half of the diameter of the spring is presented in the path of movement of the abutment means 47. In the preferred embodiment approximately one-third of the diameter of the coil spring 30 extends outside of the slot 31 and hence the groove 40 has a depth approximately one-third the diameter of this coil spring 30.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A detent to releasably hold together first and second members having a path of relative movement therebetween, said detent comprising, spring means of wire-like material and having an axis, a portion of said spring means parallel to the axis thereof being partially cylindrical in form with sections of the wire-like material therein disposed at an appreciable acute angle to a plane normal to said axis, means holding said spring means in said second member with the axis of said spring means transverse to said path of movement, a detent surface on said first member, and abutment means including said detent surface acting between said first member and said spring means, whereby when said first and second members are separated and moved in one direction along said path of movement said abutment means causes transverse compression of said spring means to axially expand same to permit detent release of said first and second members, and whereby when said first and second members are relatively moved in the opposite direction in said path of movement said abutment means causes transverse compression of said spring means to axially expand same to effect detent engagement between said first and second members.

2. A detent to releasably hold together first and second members having a path of relative movement therebetween, said detent comprising, coil spring means of wide spaced turns, means holding said coil spring means in said second member with the lengthwise dimension of said spring means transverse to said path of movement, a detent surface on said first member, and abutment means including said detent surface acting between said first member and said coil spring means, whereby when said first and second members are separated and moved in one direction along said path of movement said abutment means causes radial compression of said coil spring means to longitudinally expand same to permit detent release of said first and second members, and whereby when said first and second members are relatively moved in the opposite direction in said path of movement said abutment means causes radial compression of said coil spring means to longitudinally expand same to effect detent engagement between said first and second members at said coil spring means.

3. A detent to releasably hold together first and second members having a path of relative movement therebetween, said detent comprising a slot surface defining a slot in said second member adjacent said path of movement, a coil spring of wide spaced turns disposed in said slot with the lengthwise dimension of said spring transverse to said path of movement, a detent surface on said first member, stop means coacting between said first and second members, said detent surface and said stop means on said first member having opposing surfaces, and abutment means including said detent surface acting between said first member and said coil spring, whereby when said first and second members are separated and moved in one direction along said path of movement said abutment means radially compresses said coil spring to longitudinally expand same to permit said detent surface to pass said slot for releasing said first and second members, and whereby when said first and second members are relatively moved in the opposite direction in said path of movement said abutment means radially compresses said coil spring to longitudinally expand same to permit said detent surface to pass said slot and to effect detent engagement between said first and second members at the same time that said stop means of said first and second members are in engagement.

4. A detent to releasably hold together first and second members having at least one path of relative movement therebetween, said detent comprising a slot surface defining a slot in said second member adjacent said path of movement, a coil spring of wide spaced turns disposed in said slot with the lengthwise dimension of said spring transverse to said path of movement, a longitudinal opening of said slot adjacent said path of movement, approximately one-third of the diameter of said spring extending out of said slot into said path of movement, an engagement surface on said first member, a shoulder on said first member adjacent said engagement surface, stop means coacting between said first and second members with said stop means being in engagement simultaneously with said spring engaging said engagement surface, and said engagement surface and said stop means on said first member having opposing surfaces, whereby when said first and second members are separated and moved along said path of movement in one direction said engagement surface engages and radially compresses said coil spring to longitudinally expand same to permit said shoulder to pass said slot for releasing said first and second members, and whereby when said first and second members are relatively moved in the opposite direction in said path of movement said shoulder engages and radially compresses said coil spring to longitudinally expand same to permit said shoulder to pass said slot and said coil spring engages said engagement surface at the same time that said stop means of said first and second members are in engagement.

5. A detent to releasably hold together first and second members interconnected at a pivot point for at least one path of relative movement therebetween, said detent comprising a slot surface defining a slot in said second member adjacent said path of movement, a coil spring of wide spaced turns with the pitch exceeding the diameter thereof disposed in said slot with the lengthwise dimension of said spring transverse to said path of movement, a longitudinal opening of said slot adjacent said path of movement of lesser dimension than the diameter of said spring to retain said spring in said slot, approximately one-third of the diameter of said spring extending out of said slot into said path of movement, an engagement surface on said first member, a shoulder on said first member adjacent said engagement surface, stop means coacting between said first and second members with said stop means being in engagement simultaneously with said spring engaging said engagement surface, and said engagement surface and said stop means on said first member having opposing surfaces, whereby when said first and second members are separated and moved along said path of movement in one direction said engagement surface engages and radially compresses said coil spring to longitudinally expand same to permit said shoulder to pass said slot for releasing said first and second members, and whereby when said first and second members are relatively moved in the opposite direction in said path of movement said shoulder engages and radially compresses said coil spring to longitudinally expand same to permit said shoulder to pass said slot and said coil spring engages said engagement surface at the same time that said stop means of said first and second members are in engagement.

6. A detent to releasably hold first and second members with a path of relative movement therebetween, said detent comprising, a detent surface in said first member, a shoulder on said first member adjacent to said detent surface, spring means having an axis and a partially cylindrical portion parallel to said axis, means to mount said spring means on said second member with said partially cylindrical portion extending into said path of relative movement with said spring means axis transverse to said path of relative movement, whereby as the first and second members are relatively moved together said shoulder engages the partially cylindrical portion of said spring means to meet resistance to movement and to compress said spring means transversely to expand same axially to permit said spring means to engage said detent surface.

7. A detent to hold a first member relative to a second member with said members having a path of movement relative to each other, said detent comprising, a detent surface in said first member, a shoulder on said first member adjacent to said detent surface, spring means of wire-like material and having an axis, a portion of said spring means parallel to the axis thereof being partially cylindrical in form with sections of the wire-like material therein disposed at an appreciable acute angle to a plane normal to said axis, and a recess in said second member to receive said spring means with said partially cylindrical portion extending out of said recess into said path of relative movement and with the axis of said spring means generally transverse to said path of relative movement, whereby as the first and second members are relatively moved together said shoulder engages the partially cylindrical portion of said spring means to meet resistance to movement and to compress said spring means transversely to expand same axially to permit the first member to come into detent engagement with said second member by having said spring means engage said detent surface.

8. A detent to hold a first member relative to a second member, said first and second member each having first and second sides with means to relatively pivot said members about an axis near said second sides for a path of relative movement therebetween, said detent comprising, a detent surface in said first member generally parallel to and near said first side, a shoulder on the periphery of said first member inboard of and adjacent to said detent surface, spring means of wire-like material and having an axis, a portion of said spring means parallel to the axis thereof being partially cylindrical in form with sections of the wire-like material therein disposed at an appreciable acute angle to a plane normal to said axis, and a recess near said first side of said second member to receive said spring means with said partially cylindrical portion extending out of said recess into said path of relative movement and with said pivot and spring means axes generally parallel, whereby as the first member is moved toward said second member said shoulder engages the partially cylindrical portion of said spring means to meet resistance to movement and to compress said spring means transversely to expand same axially to permit the first member to come into detent engagement with said second member by having said spring means engage said detent surface.

9. A detent to hold a first member relative to a second member, said second member having a cavity with first and second sides and having an axis, said first member having an axis and having an outer surface for complementary engagement generally coaxial with said cavity, said detent comprising a detent surface in said first member generally parallel to and near said first side, a shoulder on the periphery of said first member inboard of and adjacent to said detent surface, spring means of wire-like material and having an axis, a portion of said spring means parallel to the axis thereof being partially cylindrical in form with sections of the wire-like material therein disposed at an appreciable acute angle to a plane normal to said axis, a recess near said first side of said cavity to receive said spring means with said partially cylindrical portion extending out of said recess into said cavity and with said axes generally parallel, and means for holding said second side of said first member in engagement with said second side of said cavity, whereby as the first member is moved into engagement with said cavity said shoulder engages the partially cylindrical portion of said spring means to meet resistance to movement and to compress said spring means transversely to expand same axially to permit the first member to come into interfitting engagement with said cavity and to have said spring means engage said detent surface.

10. A detent to hold an insert in a tool, said tool having a cavity with first and second sides and having an axis, said insert having an axis and having an outer surface for complementary engagement coaxial with said cavity, said detent comprising a surface defining an axially parallel groove in said insert generally parallel to and near the first side of said insert, a shoulder on the periphery of said insert inboard of an adjacent to said groove, a surface in said tool defining a slot near said first side of said cavity, a coil spring of wide spaced turns in said slot engaging the surface thereof, a portion of about one-third the diameter of said coil spring extending inwardly from the surface of said cavity to extend into said groove in said insert and extending into a path of movement of said shoulder as the insert is moved into complementary interfitting engagement with said cavity, and means for holding said second side of said insert in engagement with said second side of said cavity, whereby as the insert is moved into engagement with said cavity said shoulder engages the spring to meet resistance to movement and to compress said spring radially to expand same axially to permit the insert to come into interfitting engagement with said cavity and to have said spring engage said groove.

11. A detent to hold an insert in a tool, said tool having a cavity with first and second sides and having an axis, said insert having an axis and having an outer surface for complementary engagement coaxial with said cavity, said detent comprising a surface defining an axially parallel groove in said insert of about one hundred twenty degrees arcuate extent generally parallel to and near the first side of said insert, a shoulder on the periphery of said insert inboard of and adjacent to said groove, a surface in said tool defining a slot near said first side of said cavity, a coil spring of wide spaced turns in said slot engaging the surface thereof, a portion of about one hundred twenty degrees arcuate extent of said coil spring extending inwardly from the surface of said cavity to extend into said groove in said insert and extending into a path of movement of said shoulder as the insert is moved into complementary interfitting engagement with said cavity, and means for holding said second side of said insert in engagement with said second side of said cavity, whereby as the insert is moved into engagement with said cavity said shoulder engages the spring to meet resistance to movement and to compress said spring radially to expand same axially to permit the insert to come into interfitting engagement with said cavity and to have said spring engage said groove.

12. A detent to hold an insert in a tool, said tool having a semi-cylindrical cavity with first and second sides and having an axis, said insert having an axis and having a semi-cylindrical outer surface for complementary engagement coaxial with said semi-cylindrical cavity, said detent comprising an axially parallel groove of about one hundred twenty degrees arcuate extent generally parallel to and near the first side of said insert, a portion of the periphery of said semi-cylindrical surface on said insert constituting a shoulder inboard of and adjacent to said groove, a slot near said first side of said cavity, said slot being partially cylindrical of greater than one hundred eighty degrees extent, counterbores at each end of said slot, a spool end in each counterbore covering the ends of said slot to prevent the entrance of foreign matter thereinto, a coil spring of wide spaced turns in said slot engaging the wall thereof, means to retain said spool ends in said counterbores, a portion of about one hundred twenty degrees arcuate extent of said coil spring extending inwardly from the cylindrical surface of said cavity to extend into said groove in said insert and extending into a path of movement of said shoulder as the insert is moved into complementary interfitting engagement with said cavity, and means for holding said second side of said insert in engagement with said second side of said cavity, whereby as the insert is moved into engagement with said cavity said shoulder engages the spring to meet resistance to movement and to compress said spring radially to expand same axially to permit the insert to come into interfitting engagement with said cavity and to have said spring engage said groove.

13. A detent to hold an insert in a tool, said tool having a semi-cylindrical cavity with first and second sides and having an axis, said insert having an axis and having a semi-cylindrical outer surface for complementary engagement coaxial with said semi-cylindrical cavity, said detent comprising first and second axially parallel grooves of about one hundred twenty degrees arcuate extent generally parallel to and near the first and second sides of said insert, a portion of the periphery of said semi-cylindrical surface on said insert constituting a shoulder inboard of and adjacent to each said groove, first and second slots near said first and second sides of said cavity, respectively, each said slot being partially cylindrical of greater than one hundred eighty degrees extent, counterbores at each end of each said slot, a spool end in each said counterbore covering the ends of said slots to prevent entrance of foreign matter thereinto, a coil spring of wide spaced turns in each said slot engaging the walls thereof, means to retain said spool ends in said counterbores, and a portion of about one hundred twenty degrees arcuate extent of each said coil spring extending inwardly from the cylindrical surface of said cavity to extend into said grooves in said insert and extending into a path of movement of one of said shoulders as the insert is moved into complementary interfitting engagement with said cavity, whereby as the insert is moved into engagement with said cavity one of said shoulders engages the respective spring to meet resistance to movement and to compress said spring radially to expand same axially to permit the insert to come into interfitting engagement with said cavity and to have said springs engage said grooves.

14. A detent to hold a die half in a pressing tool, said tool having a semi-cylindrical cavity with first and second sides and having an axis, said die half having an axis and having a semi-cylindrical outer surface for complementary engagement coaxial with said semi-cylindrical cavity, said detent comprising an axially parallel groove of about one hundred twenty degrees arcuate extent closely adjacent and generally parallel to the first side of said die half, a portion of the periphery of said semi-cylindrical surface on said die half constituting a shoulder inboard of and adjacent to said groove, a slot closely adjacent said first side of said cavity, said slot being partially cylindrical of about two hundred forty degrees extent, a central shaft in said slot of smaller diameter than said partially cylindrical slot, a coil spring of wide spaced turns in said slot surrounding said shaft and spaced therefrom and engaging the wall of said slot, the axial length of said spring being slightly less than the length of said slot, a spool end on each end of each shaft covering the end of said slot to prevent entrance of foreign matter thereinto, counterbores at each end of said slot to receive said spool ends, a portion of about one hundred twenty degrees arcuate extent of said coil spring extending inwardly from the cylindrical surface of said cavity to extend into said groove in said die half and extending into a path of movement of said shoulder as the die half is moved into complementary interfitting engagement with said cavity, and means for holding said second side of siad die half in engagement with said second side of said cavity, whereby as the die half is moved into engagement with said cavity said shoulder engages the spring to meet resistance to movement and compresses said spring radially to expand same axially to permit the die half to come into interfitting engagement with said cavity and to have said spring engage said groove.

15. A detent to hold a die half in a pressing tool, said tool having a semi-cylindrical cavity with first and second sides and having an axis, said die half having an axis and having a semi-cylindrical outer surface for complementary engagement with said semi-cylindrical cavity in coaxial relationship with said cavity, said detent comprising first and second axially parallel grooves of about one hundred twenty degrees arcuate extent closely adjacent and generally parallel to the first and second sides of said die half, portions of the periphery of said semi-cylindrical surface on said die half constituting a shoulder inboard of and adjacent to each said groove, first and second slots closely adjacent said first and second sides of said cavity, respectively, each said slot being partially cylindrical of about two hundred forty degrees extent, a central shaft in each said slot of smaller diameter than said partially cylindrical slot, a coil spring of wide spaced turns in each said slot surrounding said shaft and spaced therefrom and engaging the walls of said slot, the axial length of said springs being slightly less than the length of said slots, a spool end on each end of each shaft covering the end of said slot to prevent entrance of foreign matter thereinto, counterbores at each end of each slot to receive said spool ends, and a portion of about one hundred twenty degrees arcuate extent of each said coil spring extending inwardly from the cylindrical surface of said cavity to extend into said grooves in said die half and extending into a path of movement of one of said shoulders as the die half is moved into complementary interfitting engagement with said cavity, whereby as the die half is moved into engagement with said cavity one of said shoulders engages the respective spring to meet resistance to movement and compresses said spring radially to expand same axially to permit the die half to come into interfitting engagement with said cavity and to have said springs engage said grooves.

16. A detent to releasably hold together first and second members having a path of relative movement therebetween, said detent comprising, spring means of wire-like material and having an axis, a portion of said spring means being partially cylindrical in form with sections of the wire-like material therein disposed at an appreciable acute angle to a plane normal to said axis, means holding said spring means in said second member with the axis of said spring means transverse to said path of movement, a detent surface on said first member, and abutment means including said detent surface acting between said first member and said spring means, whereby when said first and second members are separated and moved in one direction along said path of movement said abutment means causes transverse compression of said spring means to permit detent release of said first and second members, and whereby when said first and second members are relatively moved in the opposite direction in said path of movement said abutment means causes transverse compression of said spring means to effect detent engagement between said first and second members.

References Cited in the file of this patent
UNITED STATES PATENTS
2,336,095    Heding    Dec. 7, 1943